(12) United States Patent
Qin

(10) Patent No.: US 7,039,830 B2
(45) Date of Patent: May 2, 2006

(54) BACKUP/RECOVERY SYSTEM AND METHODS FOR PROTECTING A COMPUTER SYSTEM

(75) Inventor: Simon Qin, Chongqing (CN)

(73) Assignee: Far Stone Technology Corporation, Taipei (TW)

( * ) Notice: Subject to any disclaimer, the term of this patent is extended or adjusted under 35 U.S.C. 154(b) by 453 days.

(21) Appl. No.: 09/750,160

(22) Filed: Dec. 29, 2000

(65) Prior Publication Data

US 2002/0078397 A1    Jun. 20, 2002

(30) Foreign Application Priority Data

Dec. 14, 2000    (TW) ............................... 89126682 A

(51) Int. Cl.
*G06F 11/00*    (2006.01)
(52) U.S. Cl. ............................................. 714/13; 714/2
(58) Field of Classification Search ................. 714/13, 714/2, 15–16, 20, 39, 47, 11–12; 713/200, 713/201

See application file for complete search history.

(56) References Cited

U.S. PATENT DOCUMENTS

| | | | | |
|---|---|---|---|---|
| 5,513,314 A | * | 4/1996 | Kandasamy et al. ............ 714/6 |
| 5,623,600 A | * | 4/1997 | Ji et al. ........................ 713/201 |
| 5,889,943 A | * | 3/1999 | Ji et al. ........................ 713/201 |
| 5,913,219 A | * | 6/1999 | Baek et al. .................... 707/202 |
| 6,073,128 A | * | 6/2000 | Pongracz et al. .............. 707/3 |
| 6,393,568 B1 | * | 5/2002 | Ranger et al. ................ 713/188 |
| 6,496,944 B1 | * | 12/2002 | Hsiao et al. ................... 714/15 |
| 6,651,077 B1 | * | 11/2003 | East et al. .................... 707/204 |

* cited by examiner

*Primary Examiner*—Dieu-Minh Le
(74) *Attorney, Agent, or Firm*—Birch, Stewart, Kolasch & Birch, LLP

(57) ABSTRACT

A backup/recovery system and methodology that securely backs up and reliably retrieves data in a computer system. According to the invention, the backup/recovery system is utilized for protecting the computer system, having a data storage device, such as a hard disk, with data stored thereon, on which real-time data backup protection is required, in order to receive data from LAN/WAN afterwards without risk. In one embodiment of the invention, the backup/recovery system is installed in the computer system. The computer system includes an application layer coupled to an interface and operated predetermined application programs. A detecting module is located within the computer system for monitoring a predetermined data to be downloaded to the computer system. When the predetermined data is arrived to the computer system, the detecting module determines whether there is a predetermined harmful data contained in the predetermined data. If there is a predetermined harmful data contained therein, the backup/recovery system backs up data, and the interface implements a predetermined procedure thereafter, so that application layer can access the predetermined data safely.

20 Claims, 2 Drawing Sheets

BACKUP/RECOVERY SYSTEM AND METHODS FOR PROTECTING A COMPUTER SYSTEM

BACKGROUND OF THE INVENTION

1. Field of the Invention

The present invention relates to a backup/recovery technique for a computer system, and more particularly to a method for protecting a computer system with a backup/recovery system.

2. Description of Prior Art

The protection for the computer system is an important issue for a computer user at present. Chain mails for the spread of virus by way of Internet are increasingly overabundance in virtue of vigorous development of network. Modern people get used to E-mails (electronic mails) as the connecting interface between human beings. Afterwards, they often receive greetings and messages sent out from others, as well as the annoying spam. Further, it is impossible to guard against viruses smuggled by concealing in between the mails.

Computer viruses are buried or hidden in another program. Once the program is executed, the virus is activated and attaches itself to other programs in the system. Nowadays, viruses are frequently spread by the smuggling with files in a predetermined form, such as *.EXE, *.DOC, and *.ZIP form attached to the e-mails. When the user is ignorant of what happened and operates the attached files, the computer will be affected by poison. Viruses will send themselves to the entire mailing list of the users' record of communication. If the users relax their vigilance and operate the virus-smuggled files, there will be a chain-infected reaction that causes the disaster worldwide.

Moreover, for the PC (personal computer) users, they will risk interconnecting of computers into networks. If the viruses infects the users' computers, viruses usually destroy the files throughout the disks and all computer files may be deleted that lose the essential data in the twinkling of an eye and cause the computer system operation out of order. If files in the operating system have been infected and destroyed, the operating system, such as Windows, cannot be rebooted. The more serious effect is that the computer system needs to be setup again. Hence, there is a need for eliminating viruses from computers and networks.

Conventionally, a used backup/recovery software, although having the backup/recovery function, it is capable of executing the backup program for backing up data, also of executing the recovery program for restoring the data to the hard disk (HD), in order to protect the HD with the function of returning to a normal state. Nevertheless, not only the HD is not thoroughly protected, but also the backup/recovery operation always wastes the user lots of time.

For instance, the conventional backup/recovery software, such as the Ghost software developed by Symantec Corporation, needs the network administrator to operate the operating system (OS) before he/she manually operates a backup/recovery program. The Ghost software includes a backup program to back up all data stored in selected partition/hard disk to a file. In addition, it further includes a recovery program to restore the data from the file to the selected partition/hard disk. Prior to backing up the data, the Ghost software stops all other tasks in the computer. All running applications are closed before the backup procedure. It then creates the backup file, with the backed-up data, in a single task procedure. This backup procedure takes about 8 minutes per Gigabyte, in general. Since the Ghost software backs up all the valid data stored in the hard disk, the data itself backed up by the Ghost software occupies an extremely large space in the hard disk. All data provided currently used by the file system of the operating system (OS) will be backed up into the backup file, nevertheless whether such related data has been changed or not in the past, thereby occupying a great amount of space in the hard disk.

Further, some presently available backup/recovery software, such as the Goback software developed by Adaptec Corporation, operates its recovery program without the need of operating the operating system (OS) in advance. While initiating a recovery operation, the Goback software recoveries the hard disk to a selected status. When the computer system is destroyed, the operation of restoring the hard disk also needs the network administrator to implement the recovery program manually.

Obviously, when the computer system is surfing the web or receiving electronic mails by the user, the virus could be easily infect the user's hard disks. The virus will then break out that causes the accidental damage of the computer system. Moreover, if the virus is successful, the computer cannot be booted from either the hard disk or the floppy. Nevertheless, the conventional backup/recovery software is unable to effectively distinguish the possible danger of receiving data from the Internet, not to mention the fact that it is incapable of backing up data promptly.

Conversely, various conventional devices have been proposed for the detection of virus intrusions on the computer system. For example, the InterScan VirusWall developed by Trend Micro Corporation, it provides Internet gateway protection against viruses and malicious code. The detection is for all SMTP, HTTP, and FTP Internet traffic at the gateway and blocks malicious mobile code at the gateway. It can be configured to respond to virus detection and security violation incidents in three ways, such as alerts the system administrator, just deletes the infected file or permits the user to download the file under certain controlled conditions, optionally isolates the infected file for later treatment.

The previous anti-virus software may provide Internet real-time virus detection during surfing the web and blockage of viruses included with electronic mails, however, the backup/recovery technique is not available in such anti-virus software. This result in harm of the hard disk for a computer system, in a situation of the undefined viruses. As described above, the anti-virus software cannot back up and/orrecover data in the hard disk. Hence, in case of contingency, the computer system is destroyed, the disks cannot return to the normal state. The demand of real-time backup/recovery for the user cannot be served well.

Accordingly, because of the presently anti-virus software doesn't contain backup/recovery function and current backup/recovery software products cannot recognize the possible danger of receiving data from the Internet to protect the computer system, there is a need in the art to provide a backup/recovery software for protecting a computer system much more efficiently.

The present invention overcomes the limitations and shortcomings of the prior art with systems and methods for protecting a computer system with files automatically backed up to the data storage device, such as a hard disk prior to downloading data to the end-users' computers. It will be appreciated that the system and method of the present invention may provide computer system protection from viruses introduced by data downloaded from the largely unregulated network.

SUMMARY OF THE INVENTION

Accordingly, an object of the present invention is to provide a backup/recovery system and methods, which can be used in a computer system to securely back up and reliably retrieve data. The improvement is remarkable for the data storage device while its data is under whole automatic protection from viruses.

To achieve the above and other objects, this invention applies a detecting module in the backup/recovery system to monitor a predetermined data to be downloaded to the computer system. When a predetermined data is arrived to the computer system, the detecting module determines whether there is a predetermined harmful data contained in the predetermined data. If there is a predetermined harmful data contained therein, the backup/recovery system backs up data automatically prior to downloading the predetermined data, so as to protect the computer system.

One aspect of the present invention involves a backup/recovery system for detecting and backing up data immediately. The backup/recovery system is installed in a computer system. The computer system includes an application layer, which coupled to an interface. The backup/recovery system comprises a detecting module, located within the computer system, for monitoring a predetermined data. The detecting module retrieves the predetermined data, in order to determine whether there is a predetermined harmful data contained therein for judging the backup/recovery system to backup data or not. The interface implements a predetermined procedure thereafter and the application layer involves accessing the predetermined data.

Another aspect of the present invention involves a method for protecting a computer system. The method comprises three steps. First, the backup/recovery system retrieves a predetermined data to be downloaded to the computer system. Secondly, upon retrieval of a predetermined data to be downloaded, determines whether a predetermined harmful data is contained in the predetermined data. If there is predetermined harmful data contained therein, the data stored in the computer system is backed up eventually, in order to enable the computer system to return the data storage device to a previous state at the time the viruses infect the data storage device.

Further aspect of the present invention involves a method for protecting a computer system with a backup/recovery system. The computer system includes an application layer coupled to an interface. The method comprises several steps. First, the backup/recovery system installs in the computer system. The backup/recovery system comprises a detecting module for monitoring a predetermined data located within the computer system. Secondly, the detecting module retrieves the predetermined data to be downloaded to the computer system. Upon retrieval of a predetermined data to be downloaded, determines whether a predetermined harmful data is contained in the predetermined data. If the predetermined harmful data is contained, the data stored in the computer system is backed up. Then, the interface implements a predetermined procedure. Eventually, the application layer is indicated to access the predetermined message.

In the preferred embodiment of the invention, the backup/recovery system is coupled to a network device. The network device can be coupled to at least one client device by a communication link. The network device can be coupled to a server device. The server device is capable of controlling the client device's backup/recovery operation remotely and immediately. The network device comprises a network means, comprising one or more of the group consisting of a LAN, WAN, Internet, Intranet, Extranet and wireless network. The network device comprises a communication means, comprising one or more of the group consisting of electronic mail, TCP/IP sockets, RPC, HTTP, and IIOP. The predetermined harmful data comprises a file which is of a type that can contain viruses, such as .EXE, .DOC, and .ZIP extension file.

It is to be understood that both the foregoing general description and the following detailed description are exemplary, and are intended to provide further explanation of the invention as claimed.

BRIEF DESCRIPTION OF THE DRAWINGS

The above-mentioned objects and other objects and features of this invention and manner of attaining them will become apparent, and the invention itself will be understood by reference to the following description of the preferred embodiments of the invention taken in conjunction with the accompanying drawings, wherein.

DESCRIPTION OF THE PREFERRED EMBODIMENT

Figure 1:
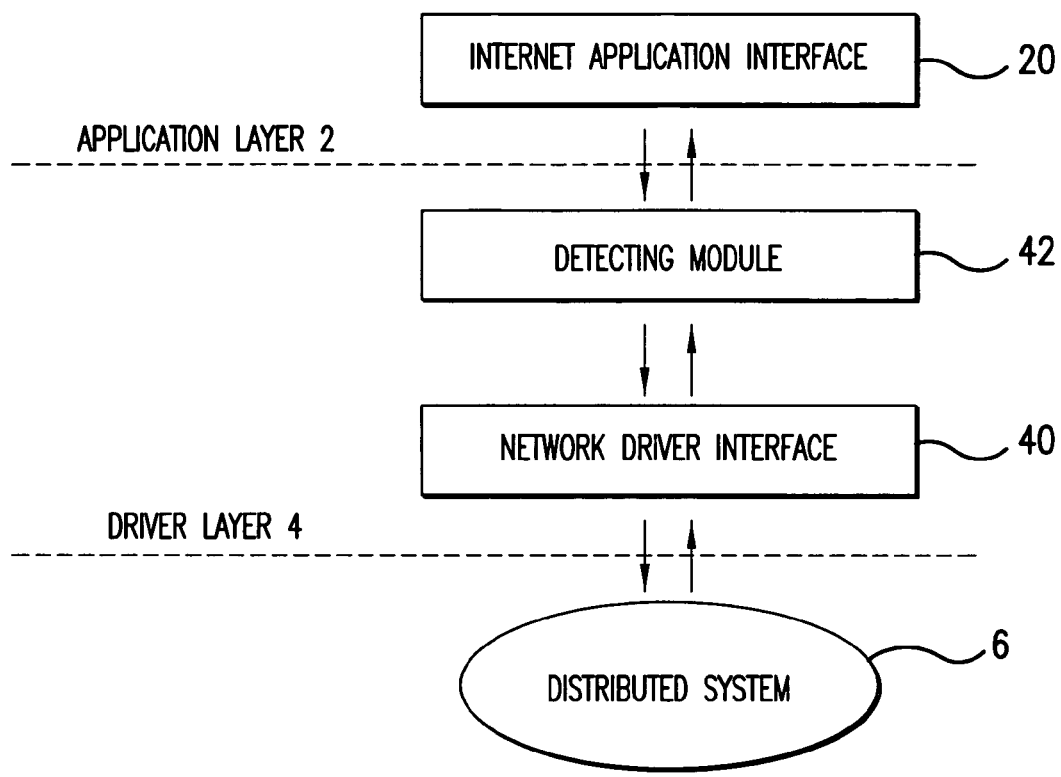
FIG. 1 illustrates parts of a computer system with a backup/recovery system as an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The present invention contemplates a backup/recovery system to provide protection for the computer system by way of a detecting module of the backup/recovery system. The real-time backup/recovery system adopts a technique for detecting network data to be downloaded to the computer system, such as data retrieved from an Internet content server in response to a browser request, which can automatically backup any file alteration to the hard disk. Here is referred to the data to be downloaded, it being understood that the invention is capable of use in various other combinations and environments and is capable of changes or modifications within the scope of the inventive concepts as expressed hereunder.

The preferred embodiment of the present invention provides a backup/recovery system installed in the computer system. The computer system comprises at least an application layer, which coupled to an interface. The application layer is used for operating a predetermined application program. The backup/recovery system comprises a detecting module, located within the computer system, for monitoring a predetermined data.

When the predetermined data is received, the detecting module determines whether there is a predetermined harmful data contained in the predetermined data. If there is a predetermined harmful data contained therein, the backup/recovery system backs up data stored in the hard disk, and the interface implements a predetermined procedure thereafter, so that application layer can access the predetermined data.

With reference to FIG. 1, according to an embodiment of the present invention a backup/recovery system may recognize the possible danger of receiving data from network effectively, and may create a restore point immediately to backup data as well.

The computer system includes an application layer 2 and a driver layer 4. The application layer 2 is used for operating a predetermined application program, and the driver layer 4 is used for operating a predetermined driver program. The application layer 2 is coupled to an interface, which installs the corresponding protocol module stored therein at the time of initiating.

The application layer 2 is a layer for operating the application program. The application layer 2 has an Internet Application interface 20. All of the network application programs, such as Internet Explorer, Outlook Express, FTP utilities and TELNET utilities, are operated at the application layer 2.

The driver layer 4 is a layer for operating the driver program. All of the network driver programs are operated at the driver layer 4. The driver layer 4 provides the network access service for the application program, and accesses LAN (local area network) and distributed system (Internet) 6 through the network interface card or other network system. The driver layer 4 has a network driver interface 40.

The backup/recovery system may couple to a network device. The network device is coupled to at least one client device by a communication link. The network device is coupled to a server device. The server device is capable of controlling the client device's backup/recovery operation remotely and immediately. The network device comprises a network means, comprising one or more of the group consisting of a LAN, WAN, Internet, Intranet, Extranet and wireless network. The network device comprises a communication means, comprising one or more of the group consisting of electronic mail, TCP/IP sockets, RPC, HTTP, and IIOP.

The backup/recovery system comprises a detecting module 42, a network monitor driver. The detecting module 42 may get into the application layer 2 or the driver layer 4 upon the backup/recovery system is installed in the computer system. While in the preferred embodiment of the present invention, the detecting module 42 of the backup/recovery system gets into the driver layer 4 for monitoring a predetermined data to be downloaded to the computer system.

When the predetermined data is received, the detecting module 42 retrieves the data. The predetermined data is coming from the behavior of downloading from the network or receiving electronic mails via Outlook Express, comprising HTTP pages, E-mails, downloading files and so forth.

Furthermore, the detecting module 42 determines whether there is a predetermined harmful data contained in the predetermined data, in order to judge whether the backup/recovery system creates a restore point to backup data stored in the hard disk. The predetermined harmful data includes the possible harmful data, which comprises a file in a predetermined form, comprising one or more of the group consisting of .EXE, .DOC, and .ZIP extension file. Other types of files are included as well.

That is, the detecting module 42 will retrieve all downloading data the application layer 2 call on the network or the receiving electronic mails via Outlook Express. The detecting module 42 monitors the data to be downloaded to the computer system. If there is a predetermined harmful data contained therein, the backup/recovery system may create a restore point immediately to backup data as well prior to downloading data to the end-users' computers.

Thereafter, the detecting module 42 transfers the predetermined data to the computer system. After the interface implements a predetermined procedure, such as dealing with the protocol module and the uniform format handling for the arrived data, the application layer 2 is informed to access the predetermined data.

Thereupon, if the arrived data cause damage to the computer system, it is capable of returning the storage device to the previous state immediately.

Accordingly, the backup/recovery system as the preferred embodiment of the present invention installed in the computer system may monitor all information from the network. Once it detects the downloading operation or the electronic mails received by Outlook Express, it creates a restore point immediately with the valid data.

The detecting module 42 monitors all information from the network entirely. Therefore, if viruses and malicious code smuggling with the downloading data or the receiving electronic mails that activated and caused the system crash, the system still can return to the normal state.

The present invention meditates a method for protecting a computer system. The method comprises three steps. First, the backup/recovery system retrieves a predetermined data to be downloaded to the computer system. Secondly, upon retrieval of a predetermined data to be downloaded, determines whether a predetermined harmful data is contained in the predetermined data. If the predetermined harmful data is contained, the data stored in the computer system is backed up eventually, in order to enable the computer system to return the data storage device to a previous state at the time the viruses infect the storage device.

In the preferred embodiment of the invention, the present invention contemplates a method for protecting a computer system with a backup/recovery system. The computer system includes an application layer coupled to an interface. First, the backup/recovery system installs in the computer system. The backup/recovery system comprises a detecting module for monitoring a predetermined data arrived to the computer system. Secondly, the detecting module retrieves the predetermined data to be downloaded to the computer system. Upon retrieval of a predetermined data to be downloaded, determines whether a predetermined harmful data is contained in the predetermined data. If the predetermined harmful data is contained, the data stored in the computer system is backed up. Then, the interface implements a predetermined procedure. Eventually, the application layer is indicated to access the predetermined data.

Figure 2:
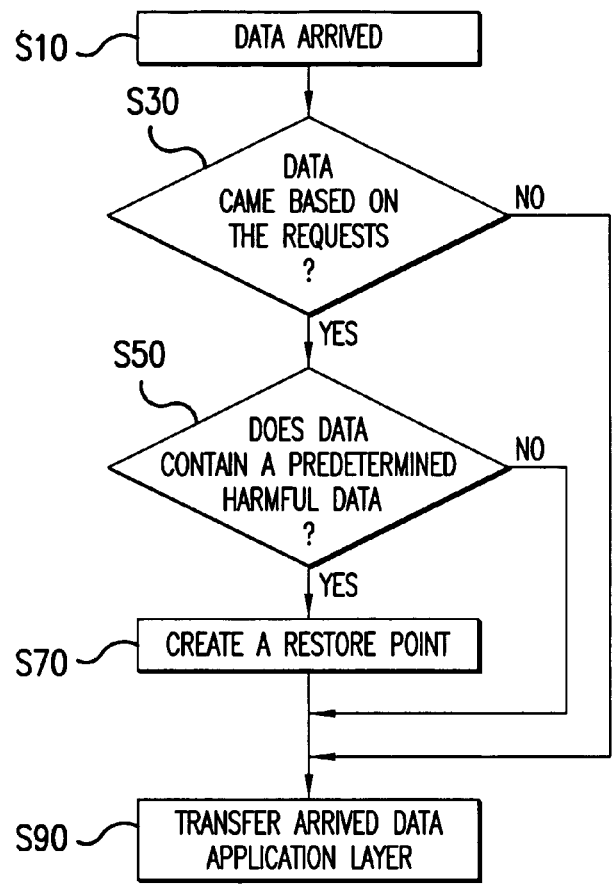
FIG. 2 illustrates a flowchart of the computer system with a backup/recovery system as an embodiment of the invention.

FIG. 2 illustrates a flowchart of the computer system with a backup/recovery system as an embodiment of the invention. First of all, Step S10 is to monitor the data to be downloaded to the computer system. Upon the data is arrived; the detecting module 42 retrieves the data and determines the data in advance.

Step S30, a second step, is to ascertain by the detecting module 42, whether the network data is downloaded to the computer system. The detecting module 42 analyzes the contents contained in the data and determines whether the data is the predetermined data the users required to be downloaded. If not, then goes to Step S90, and transfers the data to the upper layer.

If yes, then goes to Step S50. The predetermined data is coming from the behavior of downloading from the network or receiving electronic mails via Outlook Express, comprising HTTP pages, E-mails, downloading files and so forth.

Step S50, a third step, is to determine further whether the data contains a predetermined harmful data by the detecting module 42. For example, the possible harmful data may comprise a file in a predetermined form, comprising one or more of the group consisting of .EXE, .DOC, and .ZIP form. If not, such data like TXT, bitmap, then goes to Step S90 either, and the detecting module 42 transfers the data to the upper layer.

If yes, then goes to Step S70. The backup/recovery system creates a restore point automatically to backup data prior to downloading data to the computer system.

Step S90, a final step, is to send data by the detecting module 42. After the interface implements a predetermined procedure, such as processing with the protocol module and the uniform format handling for the received data, the application layer 2 is informed to access the predetermined data.

Hence, if the arrived data cause damage to the computer system, it is capable of returning the storage device to the previous state immediately.

The flow of creating a restore point in Step S70 is to scan the entire disk recognizing the valid data. Each restore point contains the data of which data in the disk is valid data. While creating a restore point, the information of the valid data is stored therein.

Please be noted that the MSTCP protocol, which is defined by the Microsoft, is communicated with the Http/Ftp/Pop3 application protocols through TDI (Transport Driver Interface) layer. In the preferred embodiment of the present invention, the detecting module 42 is intercepting network data at a TDI layer.

The Http/Ftp/Pop3 application protocol transfers data to Internet through TdiSendEntry ( ), the entry function of TDI layer, and while Internet sends data back, MSTCP protocol produces an event. An event handler function set by SetEventEntry( ) handles this event, TDI_EVENT_RECEIV. If we change the address of the function entry, the function entry of TdiSendEntry( ) and SetEventEntry( ), then we can intercept the network data.

When we operate Outlook Express to receive mails, Outlook Express will send a request of receiving mails to the mail server on the Internet. All data Outlook Express sent to Internet will pass through the TDI layer, and the driver program of the backup/recovery system located in the TDI layer will recognize that the user is going to receive mails, and the driver program revise the entry address of the event returning mails from the mail server on the Internet.

While the received mails send back from the mail server, system will use event handler function of the driver program. The event handler function handles the data contained in the mails. If there are viruses or dangerous files detected in the mails, the driver program at the TDI layer will inform the driver program of the backup/recovery system as the preferred embodiment of the present invention of creating a restore point.

In the preferred embodiment of the present invention, the restore point stores the information of the valid data. In the process of backing up data, the data needs to be backed up is stored in the restore point.

After that, the driver program sends the mails to Outlook Express. Therefore, if the users read the mails that caused the disk being damaged, then the user might return the disk to a previous state.

Figure 3:
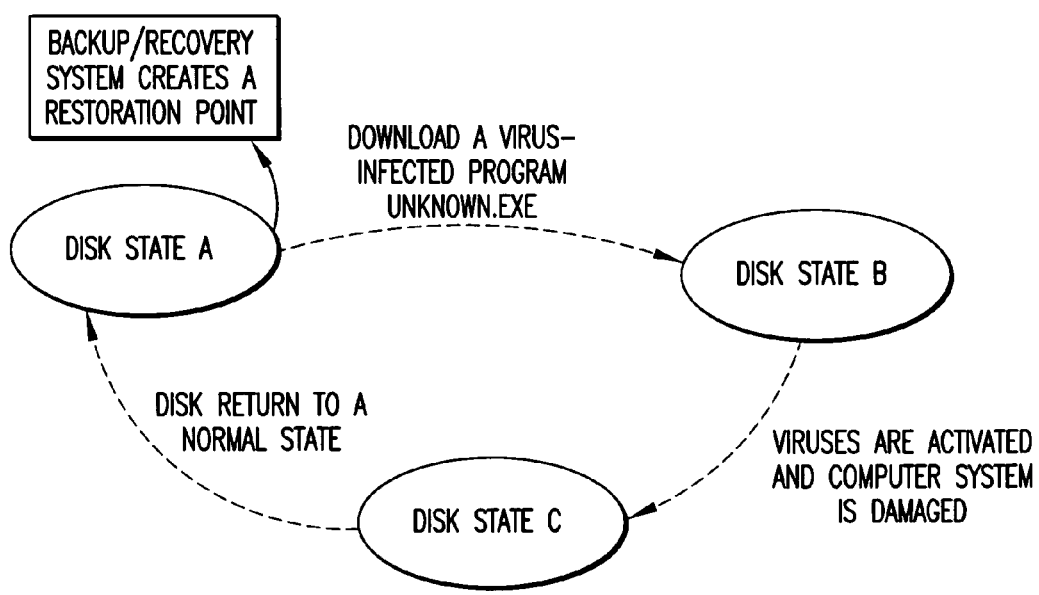
FIG. 3 illustrates a schematic diagram of the hard disk return to a previous state for protecting the computer system as an embodiment of the invention.

With reference to FIG. 3, according to an embodiment of the present invention a backup/recovery system may return the data storage device to a previous state. The state A of the hard disk in the computer system is in normal conditions. However, the detecting module 42 determines the predetermined data is contained a predetermined harmful data, and the backup/recovery system creates a restore point to backup data.

Right after that, the detecting module 42 transfers the predetermined data to the computer system. The network interface implements a predetermined procedure thereafter and the application layer 2 involves accessing the predetermined data. The user probably downloads a virus-infected program, UNKNOWN.EXE, but the user has no idea.

The predetermined data is with viruses, and the state B of the hard disk in the computer system is in abnormal conditions. Then, viruses are activated and the computer system is damaged, as shown in FIG. 3, the state C of the hard disk in the computer system is in destroying conditions.

Nevertheless, while there is an accident, the user can return the disk to a previous state with the backup/recovery system as the preferred embodiment of the present invention. The computer system is easily infected viruses while the user downloads data or receives mails, but the hard disk is capable of returning the hard disk to a normal state due to the backup/recovery system in the preferred embodiment of the present invention backs up the valid data being changed in the hard disk prior to downloading data to the computer system. Consequently, the system and the programs will never be lost or destroyed.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A backup/recovery system for protecting a computer system, said backup/recovery system being installed in said computer system, said computer system including an application layer, said application layer being coupled to an interface and operating predetermined application programs, said backup/recovery system BEING CHARACTERIZED BY
   a detecting module, located within said computer system, for monitoring a predetermined data;
   a creating module, located within said computer system, for creating a restore point;
   wherein said detecting module retrieves said predetermined data, in order to determine whether there is an executable file contained therein for judging said backup/recovery system to backup data in said computer system or not, said creating module creates a restore point prior to downloading said predetermined data, which contains said executable file, said interface implements a predetermined procedure thereafter and said application layer involves accessing said predetermined data and said backup/recovery system enables restoring said computer system to a previous state which is prior to said downloaded predetermined data arrival.

2. The system of claim 1 wherein said backup/recovery system is coupled to a network device, said network device is coupled to at least one client device by a communication link.

3. The system of claim 2 wherein said network device is coupled to a server device.

4. The system of claim 3 wherein said server device is capable of controlling said client device's backup/recovery operation remotely and immediately.

5. The system of claim 2 wherein said network device comprises a network means, comprising one or more of the group consisting of a LAN, WAN, Internet, Intranet, Extranet and wireless network.

6. The system of claim 2 wherein said network device comprises a communication means, comprising one or more of the group consisting of electronic mail, TCP/IP sockets, RPC, HTTP, and IIOP.

7. The system of claim 1 wherein said executable file comprises a file which is of a type that can contain viruses, such as .EXE, .DOC, and ZIP extension file.

8. A method for protecting a computer system, said method comprising:
- Retrieving a predetermined data to be downloaded to said computer system;
- Determining whether there being a predetermined harmful data contained in said predetermined data; and;
- Backing up data stored in said computer system at the time said predetermined harmful data being contained in said predetermined data;
- Creating a restore point; and
- Downloading said predetermined data.

9. The method of claim 8 wherein said backup/recovery system is coupled to a network device, said network device is coupled to at least one client device by a communication link.

10. The method of claim 9 wherein said network device is coupled to a server device.

11. The method of claim 10 wherein said server device is capable of controlling said client device's backup/recovery operation remotely and immediately.

12. The method of claim 9 wherein said network device comprises a network means, comprising one or more of the group consisting of a LAN, WAN, Internet, Intranet, Extranet and wireless network.

13. The method of claim 9 wherein said network device comprises a communication means, comprising one or more of the group consisting of electronic mail, TCP/IP sockets, RPC, HTTP, and IIOP.

14. The method of claim 8 wherein said predetermined harmful data comprises a file which is of a type that can contain viruses, such as .EXE, .DOC, and .ZIP extension file.

15. A method for protecting a computer system with a backup/recovery system, said computer system including an application layer, said application layer coupled to an interface and operating predetermined application programs, said method comprising:
- Installing said backup/recovery system in said computer system, said backup/recovery system having a detecting module for monitoring a predetermined data arrived to said computer system;
- Retrieving said predetermined data to be downloaded to said computer system;
- Determining whether there being a predetermined harmful data contained in said predetermined data;
- Backing up data stored in said computer system at the time said predetermined harmful data being contained in said predetermined data;
- Creating a restore point;
- Implementing a predetermined procedure by said interface; and
- Indicating said application layer access said predetermined message.

16. The method of claim 15 wherein said backup/recovery system is coupled to a network device, said network device is coupled to at least one client device by a communication link.

17. The method of claim 16 wherein said network device is coupled to a server device.

18. The method of claim 17 wherein said server device is capable of controlling said client device's backup/recovery operation remotely and immediately.

19. The method of claim 16 wherein said network device comprises a network means, comprising one or more of the group consisting of a LAN, WAN, Internet, Intranet, Extranet and wireless network.

20. The method of claim 16 wherein said network device comprises a communication means, comprising one or more of the group consisting of electronic mail, TCP/IP sockets, RPC, HTTP, and IIOP.

* * * * *